United States Patent
Masy et al.

(10) Patent No.: US 11,124,604 B2
(45) Date of Patent: Sep. 21, 2021

(54) PROCESS FOR MAKING POLYETHER DIOLS

(71) Applicant: Dow Global Technologies LLC, Midland, MI (US)

(72) Inventors: Jean-Paul Masy, Destelbergen (BE); Oguz Türünç, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 335 days.

(21) Appl. No.: 16/313,516

(22) PCT Filed: Jun. 12, 2017

(86) PCT No.: PCT/US2017/037077
§ 371 (c)(1),
(2) Date: Dec. 27, 2018

(87) PCT Pub. No.: WO2018/005056
PCT Pub. Date: Jan. 4, 2018

(65) Prior Publication Data
US 2020/0181326 A1    Jun. 11, 2020

Related U.S. Application Data

(60) Provisional application No. 62/399,695, filed on Sep. 26, 2016, provisional application No. 62/356,827, filed on Jun. 30, 2016.

(51) Int. Cl.
*C08G 65/26* (2006.01)
*B01J 23/75* (2006.01)
*C08G 65/334* (2006.01)

(52) U.S. Cl.
CPC .......... *C08G 65/2606* (2013.01); *B01J 23/75* (2013.01); *C08G 65/2663* (2013.01); *C08G 65/2696* (2013.01); *C08G 65/3346* (2013.01); *C08G 2650/56* (2013.01)

(58) Field of Classification Search
CPC ............ C08G 65/3342; C08G 65/2606; C08G 65/3344; C08L 71/02
See application file for complete search history.

(56) References Cited

U.S. PATENT DOCUMENTS

| | | | |
|---|---|---|---|
| 3,415,902 A | 12/1968 | Hickner | |
| 3,485,861 A | 12/1969 | McKellar | |
| 5,468,839 A | 11/1995 | Suppes | |
| 6,207,794 B1 * | 3/2001 | Yamasaki | C08G 18/10 528/408 |
| 2011/0098410 A1 * | 4/2011 | Harumashi | C09D 143/04 525/100 |

FOREIGN PATENT DOCUMENTS

| CA | 2822897 A | 7/2012 |
|---|---|---|
| JP | H04-209628 A | 7/1992 |
| JP | H04-209629 A | 7/1992 |
| WO | 92/019578 A | 11/1992 |
| WO | 2011/075343 A | 6/2011 |
| WO | 2012/095482 A | 7/2012 |

* cited by examiner

*Primary Examiner* — Shane Fang

(57) ABSTRACT

Polyether diols characterized by a hydroxyl number of 56 or lower, high average functionality and high primary hydroxyl content are prepared by alkoxylating an unsaturated alcohol in multiple steps to form a polyether monol that contains 39% or more primary hydroxyl groups, and then reacting the polyether monol with a mercaptoalcohol that has a primary hydroxyl group.

11 Claims, No Drawings

PROCESS FOR MAKING POLYETHER DIOLS

This invention relates to methods for making polyether diols.

Polyethers are made industrially by polymerizing alkylene oxides. The polyethers are used for, among other things, making polyurethane polymers.

There is a need for a polyether diol product having a hydroxyl number of about 56 mg KOH/g or less (corresponding to a hydroxyl equivalent weight of about 1000 or more), in which the hydroxyl groups are mainly primary, and which has a number average functionality of at least 1.8 hydroxyl groups per molecule. The high proportion of hydroxyl groups is needed to provide high reactivity towards isocyanate groups when the polyol is used to make polyurethanes. The high average functionality is needed to produce polyurethanes having good properties.

Such a polyether diol product is very difficult to produce at an industrial scale. This problem arises from limitations of the two common classes of alkylene oxide polymerization catalysts, i.e., potassium hydroxide and the so-called double metal cyanide (DMC) catalyst complexes such as zinc hexacyanocobaltate catalyst complexes.

When propylene oxide is polymerized using a potassium hydroxide catalyst, a rearrangement of propylene oxide occurs, forming allyl alcohol or prop enyl alcohol. The alcohol acts as a monofunctional initiator compound, and an unsaturated polyether monol forms as an impurity. The product is therefore a mixture of diols and monols. Although high primary hydroxyl contents can be achieved by ethoxylating this product, the average number of hydroxyl groups per molecule is often well less than 1.8, particularly with higher molecular weight products.

DMC catalyst complexes do not strongly promote the propylene oxide isomerization reaction, and therefore can be used to produce polypropylene oxide) diols having average functionalities very close to 2.0. The problem with DMC catalysts is that they cannot be used in the subsequent step of capping the polypropylene oxide) with ethylene oxide. Therefore, polyether diols made via DMC catalysis have mainly secondary hydroxyl groups instead of the desired primary hydroxyls.

There are technical solutions to the shortcomings of potassium hydroxide and DMC catalysts, but they are very expensive or otherwise impractical.

For example, the rearrangement reaction that takes place when using potassium hydroxide can be reduced by performing the polymerization at low temperatures. Doing so slows the polymerization rate, which increases batch time very significantly. This effectively reduces the capacity of the polymerization equipment and greatly increases cost.

It is also possible to produce the desired product in a two-step polymerization, in which the first step of polymerizing propylene oxide is performed in the presence of a DMC catalyst, and the second step of polymerizing ethylene oxide is performed in the presence of potassium hydroxide. This is unacceptable industrially for several reasons. An important advantage of using DMC catalysts is that the catalyst residues can be left in the product. This avoids a costly step of neutralizing and removing the catalyst, which partly compensates for the high cost of DMC catalysts relative to potassium hydroxide. The neutralization and removal steps cannot be avoided when potassium hydroxide is used in the ethoxylation step, so much of the cost advantage of using the DMC catalyst is lost. This approach also requires duplicate equipment and/or scrupulous cleaning of manufacturing equipment between batches, because the DMC catalysts are inactivated in the presence of strong bases. The extra equipment and/or cleaning steps add even more cost.

Other approaches are even less satisfactory. The polyether monol has unsaturated groups that can be hydrolyzed to produce a hydroxyl group. This increases functionality, but the hydrolysis step is difficult and expensive to perform. It is possible to produce the polyether without using propylene oxide by, for example, polymerizing tetrahydrofuran. However, the monomer is expensive, its high viscosity makes it difficult to handle and polymerize, and the resulting polyether has significantly different properties that make it unsuitable in many applications. In particular, polymers of tetrahydrofuran often are poorly compatible with other ingredients of a polyurethane formulation. One can also increase the average functionality of a polyether by performing the alkoxylation in the presence of a mixture of di- and higher-functionality initiators, but this introduces polyfunctional polyethers into the product, which can cause undesirable crosslinking.

What is desired is an economical and efficient way to produce a polyether diol product having a hydroxyl number of 56 or less and an average hydroxyl functionality of 1.8 to 2.0, in which at least 70% of the hydroxyl groups are primary.

This is invention is a method of making such a polyether diol product. The method comprises the steps of I) forming a polyether monol in a double metal cyanide-catalyzed polymerization that includes a first stage and a second stage, the polyether monol having a terminal hydroxyl group at one end of a polyether chain and at least one unsaturated terminal group at the other end of the polyether chain, the unsaturated terminal group including at least one aliphatic carbon-carbon double bond, wherein the polyether monol has a molecular weight of at least 1950 and at least 39% of the hydroxyl groups are primary, wherein:

in the first stage, an alkylene oxide containing 95 to 100% by weight 1,2-propylene oxide, 0 to 5% by weight ethylene oxide and 0 to 2% by weight of other copolymerizable monomers is polymerized in the presence of at least one initiator, said at least one initiator including at least one monoalcohol having exactly one aliphatic carbon-carbon double bond, said alkylene oxide polymerized onto at least one monoalcohol initiator in said first stage constituting 55 to 75% of the weight of the polyether monol formed in step I), and in the second stage, an alkylene oxide mixture is introduced to the reaction product formed in the first stage under polymerization conditions, wherein such alkylene oxide mixture is introduced as an alkylene oxide feed in which the concentration of the ethylene oxide in the alkylene oxide feed is continuously or intermittently increased from at most 5% by weight until the alkylene oxide feed contains 90 to 100% by weight ethylene oxide, 0 to 10% by weight 1,2-propylene oxide and 0 to 2% by weight of other copolymerizable monomers, based on the weight of the alkylene oxide feed, and the alkylene oxide feed is discontinued after the concentration of ethylene oxide in the alkylene oxide mixture reaches 90% but before or at the same time as the concentration of ethylene oxide in the alkylene oxide mixture reaches 100% by weight, and the resulting reaction mixture is thereafter digested to form the polyether monol, and then II. reacting the polyether monol from step I with a thiol-substituted primary alcohol such that the thiol reacts across the aliphatic carbon-carbon double bond of the unsaturated terminal group of the polyether monol to produce the polyether diol.

The polymerization step I produces a polyether monol in which about 39% or more of the hydroxyl groups are primary. Step II introduces primary alcohol groups at the site of the aliphatic carbon-carbon double bond, converting the polyether monol to a diol that has a number average functionality very close to 2.0 and in which 70% or more of the hydroxyl groups are primary. The selection of the double metal cyanide catalyst provides the advantages of fast polymerizations and correspondingly low cycle times, and the ability to avoid the product neutralization and catalyst removal steps that are needed when strongly basic polymerization catalysts are used. The capping step inexpensively and rapidly introduces primary hydroxyl groups, thereby increasing the proportion of primary hydroxyl groups to high levels, with little or no purification being needed.

The polymerization step I is performed by combining alkylene oxide(s) with at least one monofunctional initiator compound and a double metal cyanide catalyst complex, and subjecting the mixture to polymerization conditions. The polymerization conditions in general include a temperature of 80 to 200° C. The polymerization is generally conducted under superatmospheric pressure to maintain the alkylene oxide(s) in condensed form.

The initiator compound is an unsaturated monoalcohol that has exactly one aliphatic carbon-carbon double bond and exactly one hydroxyl group. The hydroxyl group is primary. The initiator compound is devoid of other oxyalkylatable sites such as additional hydroxyls, amine hydrogens, carboxyl groups or other sites that become alkoxylated during the polymerization. The carbon-carbon double bond may be, for example, vinyl ($CH_2$=CH—), allylic ($CH_2$=CH—$CH_2$—) or propenyl ($CH_3$—CH=$CH_2$—) unsaturation. The unsaturated monoalcohol may contain, for example, up to 30 carbon atoms, up to 20 carbon atoms or up to 12 carbon atoms. Specific examples of unsaturated monoalcohols include straight- or branched-chain monoalkenyl monoalcohols such vinyl alcohol, 1-propen-3-ol, 1-buten-4-ol, 1-hexen-6-ol, 1-heptene-7-ol, 1-octen-8-ol, 1-nonen-9-ol, 1-decen-10-ol, 1-undecen-11-ol, 1-dodecen-12-ol, allyl alcohol, and the like. Other suitable unsaturated monoalcohols include hydroxyl-containing acrylate and/or methacrylate compounds such as hydroxyethylacrylate, hydroxypropylacrylate, hydroxyethylmethacrylate, hydroxypropylmethacrylate and the like. Other suitable unsaturated monoalcohols include alkoxylates of any of the foregoing having molecular weights of up to 500, preferably up to 200. Any two or more of the foregoing may be used.

It is possible to perform polymerization step I in the presence of an initiator mixture that includes at least one monofunctional initiator as described above, and at least one additional initiator that has two or more hydroxyl groups (and preferably no other oxyalkylatable sites). The result of such a polymerization is a polyether mixture containing monols and polyols. If an additional initiator is present, it preferably has exactly two hydroxyl groups, to provide in step I a mixture of monols and diol that, after step II, is converted to a mixture of diols. Initiators having three or more oxyalkylatable sites of any type, such as triols or other polyols of higher functionality, if present, preferably constitute no more than 10 mole-percent of the initiator compound, and are most preferably absent. Most preferably, the only initiator is one or more monoalcohols as described above.

The polymerization catalyst is a double metal cyanide catalyst complex. Suitable double metal cyanide catalysts include those described, for example, in U.S. Pat. Nos. 3,278,457, 3,278,458, 3,278,459, 3,404,109, 3,427,256, 3,427,334, 3,427,335 and 5,470,813. Some suitable DMC catalysts can be represented by the formula

wherein M and $M^3$ are each metals; $M^1$ is a transition metal different from M, each X represents a group other than cyanide that coordinates with the $M^1$ ion; $M^2$ is a transition metal; A represents an anion; b, c and d are numbers that reflect an electrostatically neutral complex; r is from 4 to 6; t is from 0 to 2; x and y are integers that balance the charges in the metal salt $M^3_x A_y$, and n is zero or a positive integer. The foregoing formula does not reflect the presence of neutral complexing agents such as t-butanol which are often present in the DMC catalyst complex.

An especially preferred type of DMC catalyst is a zinc hexacyanocobaltate catalyst complex. The DMC catalyst may be complexed with an alcohol having 1 to 12 carbon atoms, such as t-butanol and/or with a polyether polyol.

In a first stage of the polymerization, the alkylene oxide introduced to the reaction contains 95 to 100% by weight 1,2-propylene oxide, 0 to 5% by weight ethylene oxide and 0 to 2% (preferably 0%) by weight of other copolymerizable monomers, based on total weight of the monomers. If a mixture of alkylene oxides is used, the components thereof are introduced together (simultaneously) rather than sequentially. The alkylene oxide(s) polymerized onto the unsaturated monoalcohol initiator(s) in the first stage constitute 55 to 75% of the total weight of the polyether monols produced in step I of the process, and may constitute 41 to 73%, 50 to 73% or 50 to 69% of the total weight thereof.

The alkylene oxide(s) added and polymerized in this first stage of the polymerization may be added to the reaction vessel all at once. It is generally preferred to feed the oxide(s) continuously or intermittently during this step of the polymerization, under polymerization conditions, to control internal reactor pressures and to control the level of unreacted oxides in the reaction vessel to a reasonable level, such as up to 10% by weight, preferably from 0.1 to 6% by weight and more preferably 0.5 to 4% by weight. The alkylene oxide(s) may be fed on demand during this first stage, by introducing the alkylene oxide(s) as they are consumed, to produce a constant reactor pressure during this stage.

Once the foregoing oxide mixture has polymerized, a second polymerization stage is performed by feeding an alkylene oxide mixture to the first-stage product under polymerization conditions. The alkylene oxide mixture introduced during this stage is a mixture of propylene oxide and ethylene oxide (optionally containing up to 2% of other copolymerizable monomers) in which the concentration of the ethylene oxide in the oxide feed is continuously or intermittently increased as the alkylene oxide mixture is fed until the alkylene oxide mixture contains 90 to 100% by weight ethylene oxide, 0 to 10% by weight 1,2-propylene oxide and 0 to 2% by weight of other copolymerizable monomers, based on the weight of the oxide feed. The alkylene oxide feed in the second stage is discontinued after the concentration of ethylene oxide in the oxide feed reaches 90% but before or at the same time as the concentration of ethylene oxide in the oxide feed reaches 100% by weight. The reaction mixture is thereafter digested. It is preferred to increase the concentration of ethylene oxide in the feed to at least 95% and more preferably to at least 98% by weight during the second stage of such a polymerization. The oxide feed added during the second polymerization stage is preferably devoid of copolymerizable monomers other than ethylene oxide and propylene oxide.

The concentration of ethylene oxide in the oxide feed in the second polymerization stage of the two-step polymerization process may be increased linearly with time, or step-wise. If increased step-wise, it may be increased in at least two, at least three, at least 4 or at least 5 steps, or any larger number of increments. The various increments do not need to be equal in duration or in the amounts of oxides fed during each step.

The average concentration of ethylene oxide fed during the second polymerization stage may be, for example, 30 to 75% or 30 to 60% of the combined weight of all monomers fed during the second stage. The average concentration of 1,2-propylene oxide added during this second polymerization stage may constitute 25 to 70% or 40 to 60% of the combined weight of all monomers fed during the second stage. Other monomers may constitute 0 to 2%, preferably 0% of all monomers fed during the second stage.

The oxide feed rate during the second polymerization stage preferably is such that the level of unreacted oxides in the reaction vessel is controlled to a reasonable level, such as up to 10% by weight, preferably from 0.1 to 6% by weight and more preferably 0.5 to 2% by weight. As before, the monomers may be fed on demand during this second stage, by introducing the monomers as they are consumed, to maintain a constant reactor pressure during this step.

At the conclusion of all additions of alkylene oxide to the reaction in the two-step polymerization process just described, the total amount of ethylene oxide polymerized onto the unsaturated monol initiator is 10 to 25%, preferably 10 to 22% and more preferably 13 to 20% of the total weight of the polyether monol product, i.e., the combined weight of the monofunctional initiator(s) plus all alkylene oxides polymerized onto the monofunctional initiator(s). The total amount of propylene oxide added in the process is 65 to 88%, preferably 68 to 88% and more preferably 70 to 84% of the total weight of the polyether monol. The monofunctional initiator(s) preferably constitutes 2 to 10% of the total weight of the polyether monol. Other copolymerizable monomers preferably constitute amounts as indicated before, if present at all.

After all of the alkylene oxides have been added into the second polymerization stage, the reaction mixture is digested to complete the reaction of the alkylene oxides. No further addition of alkylene oxides is performed during or after the digestion step. The digestion includes continued exposure of the reaction mixture to polymerization conditions in the presence of the DMC catalyst complex to polymerize most or all of the remaining alkylene oxides. The amount of unreacted alkylene oxides may be reduced in this step to, for example, less than 1%, less than 0.5% or less than 0.1% by weight.

A polyether monol formed in step I of the process may have 39% or more primary hydroxyl groups. It may have, for example, 40 to 85%, or 45 to 70% primary hydroxyl groups, with the remainder of the hydroxyl groups being secondary hydroxyl groups. The molecular weight of the polyether monol formed in step I of the process is at least 1950 and may be, for example, up to 11,950, up to 7950, up to 5950, up to 4450 or up to 3950.

The polyether composition produced in step I of the process includes a polyether monol in which a polyether chain extends from the residue of the unsaturated starter. Such polyether chain(s) include i) an internal poly(propylene) or propylene oxide-co-ethylene oxide block that contains 95 to 100% by weight polymerized propylene oxide, 0 to 5% by weight polymerized ethylene oxide, and no more than 2% of other copolymerized monomers, based on the weight of the internal propylene oxide-co-ethylene block. Such polyether chains further include ii) a terminal propylene oxide-co-ethylene oxide block that contains 30 to 75% polymerized ethylene oxide, 25 to 70% by weight polymerized 1,2-propylene oxide and no more than 2% of other copolymerized monomers. The internal propylene oxide-co-ethylene oxide block may constitute 41 to 73% of the weight of the polyether monol. The external propylene oxide-co-ethylene oxide block may constitute 25 to 49% of the weight of the polyether monol. The internal and external blocks together may constitute at least 90% of the weight of the polyether monol. At least 39%, preferably 40 to 85% or 45 to 70%, of the hydroxyl groups of the polyether monol are primary hydroxyls. Polymerized ethylene oxide may constitute 10 to 25% of the weight of the polyether monol.

If other initiators having higher functionalities are present, the product from step I will be a mixture of the polyether monol and one or more polyether polyols.

The thiol compound has exactly one thiol group and exactly one hydroxyl group, which is a primary hydroxyl group. It should have no other isocyanate-reactive groups. Examples of suitable thiol compounds include thiol-substituted alcohols such as 2-mercaptoethanol, 2-mercapto-n-propanol, 3-mercapto-n-propanol, 4-mercapto-n-butanol and 6-mercapto-n-hexanol.

In step II of the process, the amount of thiol compound provided may be sufficient to provide 0.9 to 5 equivalents of the thiol compound per equivalent of unsaturated polyether monol present in the polyether mixture formed in step a). A preferred amount is at least 0.95, at least 0.98 or at least 1 equivalent of thiol compound per equivalent of unsaturated polyether monol. It is generally preferred to employ an excess of the thiol compound when the reaction is performed in the presence of a basic catalyst. In general, there is no need to provide more than a small excess of the thiol compound when the reaction is performed in the presence of free radicals, so a preferred amount in that case is up to 1.1 or 1.05 equivalents of thiol compound per equivalent of unsaturated polyether monol.

The reaction of the thiol compound with the polyether mixture can be performed in the presence of a basic catalyst or in the presence of free radicals, if desired.

Suitable catalysts include basic compounds capable of directly or indirectly extracting a hydrogen from a thiol group to form a thiolate anion. In some embodiments, the basic catalyst does not contain thiol groups and/or amine hydrogens. Such a basic catalyst preferably is the conjugate base of a material having a pKa of at least 5, preferably at least 10. Examples of these include inorganic compounds such as salts of a strong base and a weak acid, of which potassium carbonate and potassium carboxylates are examples, various amine compounds, and various phosphines.

Suitable amine catalysts include various tertiary amine compounds, cyclic amidine compounds such as 1,8-diazabicyclo-5.4.0-undecene-7, tertiary aminophenol compounds, benzyl tertiary amine compounds, imidazole compounds, or mixtures of any two or more thereof. Tertiary aminophenol compounds contain one or more phenolic groups and one or more tertiary amino groups. Examples of tertiary aminophenol compounds include mono-, bis- and tris(dimethylaminomethyl)phenol, as well as mixtures of two or more of these. Benzyl tertiary amine compounds are compounds having a tertiary nitrogen atom, in which at least one of the substituents on the tertiary nitrogen atom is a benzyl or substituted benzyl group. An example of a useful benzyl tertiary amine compound is N,N-dimethyl benzylamine.

Imidazole compounds contain one or more imidazole groups. Examples of imidazole compounds include, for example, imidazole, 2-methylimidazole, 2-ethyl-4-methylimidazole, 2-undecylimidazole, 2-heptadecylimidazole, 2-phenylimidazole, 2-phenyl-4-methylimidazole, 1-benzyl-2-methylimidazole, 2-ethylimidazole, 2-isopropylimidazole, 2-phenyl-4-benzylimidazole, 1-cyanoethyl-2-undecylimidazole, 1-cyanoethyl-2-ethyl-4-methylimidazole, 1-cyanoethyl-2-undecylimidazole, 1-cyanoethyl-2-isopropylimidazole, 1-cyanoethyl-2-phenylimidazole, 2,4-diamino-6-[2'-methylimidazolyl-(1)']ethyl-s-triazine, 2,4-diamino-6-[2'-ethylimidazolyl-(1)']ethyl-s-triazine, 2,4-diamino-6-[2'-undecylimidazolyl-(1)']ethyl-s-triazine, 2-methylimidazolium-isocyanuric acid adduct, 2-phenylimidazolium-isocyanuric acid adduct, 1-aminoethyl-2-methylimidazole, 2-phenyl-4,5-dihydroxylmethylimidazole, 2-phenyl-4-methyl-5-hydroxymethylimidazole, 2-phenyl-4-benzyl-5-hydroxymethylimidazole, and compounds containing two or more imidazole rings obtained by dehydrating any of the foregoing imidazole compounds or condensing them with formaldehyde.

Other useful basic catalysts include phosphine compounds, i.e., compounds having the general formula $R^3{}_3P$, wherein each $R^3$ is hydrocarbyl or inertly substituted hydrocarbyl. Dimethylphenyl phosphine, trimethyl phosphine, triethylphosphine and the like are examples of such phosphine catalysts.

A suitable amount of a basic catalyst is typically from about 0.01 to about 10 moles of catalyst per equivalent of thiol groups.

Free radicals can be provided by including free-radical initiators in the reaction mixture. Suitable free-radical initiators include thermally decomposable and/or photoactivated free radical compounds that produce free radicals when heated to a temperature in the range of 50 to 160° C., especially 65 to 120° C. and more preferably 70 to 100° C. Such a thermally-decomposable free radical initiator compound may have a 10 minute half-life temperature of 50 to 120° C. Such free-radical initiators include, for example, various peroxy compounds such as peroxides, peresters and percarbonates, and various azo compounds, as well as phenone compounds such as 1,1-dimethoxy phenyl acetophenone.

Free radicals also can be provided by exposing the reaction mixture to conditions that generate free radicals. Free radicals can be provided by, for example, exposing the reaction mixture to a light source, preferably a source of ultraviolet light such as a mercury discharge lamp or a UV-producing LED, optionally together with providing a photoactivatable free radical initiator. The ultraviolet light source may provide UV radiation at an intensity of, for example, 10 mW/cm² to 10 W/cm². In other embodiments, free radicals are provided by exposing the reaction mixture to a plasma.

The reaction conditions used depend somewhat on the method of catalysis. When using basic catalyst, preferred conditions include an elevated temperature, such as 50 to 120° C., especially 70 to 100° C., for a period of 10 minutes to five hours, preferably 30 to 150 minutes. When a free-radical initiator is used, the temperature is sufficient to thermally decompose the initiator, as described above, and the reaction time may be as described with respect to the base-catalyzed reactions. Photo-initiated and/or plasma-induced reactions may be performed at temperatures of 10° C. or even lower, up to 100° C., preferably 20° C. to 40° C., with reaction times being as for base- or free-radical-induced reactions.

The progress of the reaction and formation of the reaction product of the thiol compound and the unsaturated polyether monol can be followed by $C^{13}$ NMR, with the progress of the reaction being indicated by the disappearance of resonances corresponding to allyl and/or propenyl carbons, as appropriate.

The reaction of the thiol compound with the unsaturated group of the unsaturated polyether monol is an addition reaction. For that reason, the reaction forms no by-products that need to be removed from the product obtained in step b) of the process. It is usually desirable to remove excess thiol compound (if any), volatiles and other impurities from the polyether mixture formed in step a) of the process. This can be done using various devolatilization and/or stripping processes, and can be done either before or after performing step b).

The product of the reaction of the polyether monol with the thiol compound is a polyether diol, or a mixture of polyether monols and diols if not all of the carbon-carbon double bonds of the polyether monol produced in step I are consumed. If a mixture of polyether monols and diols is produced, at least 90 mole-% of the mixture is a diol, to produce a number average functionality of at least 1.8, preferably at least 1.9, hydroxyl groups per molecule. The average functionality may be at least 1.95 or at least 1.975, and may be up to 2.05 or up to 2.0 when step I is performed only in the presence of the unsaturated monoalcohol initiator. The hydroxyl number of the product is 56 or less, preferably 7 to 56 or 14 to 40. At least 70% of the hydroxyl groups are primary.

The polyol diol (or polyether mixture) obtained from the process is useful for making reaction polymers by reaction with one or more polyisocyanate compounds. These reaction polymers are known in the art generally as "polyurethanes" and include polymers having urethane groups formed in the reaction of the hydroxyl groups of the polyol mixture with isocyanate groups. The reaction polymer may contain other groups formed in the reaction of isocyanate groups. The reaction may be performed in the presence of a blowing agent, which may be a physical (endothermic) type or a chemical (exothermic) type such as water or other compound that generates carbon dioxide or nitrogen under the conditions of the curing reaction. The reaction polymer may be, for example, a non-cellular elastomer, a microcellular elastomer, a flexible foam, a semi-flexible foam, a rigid foam, or a thermoplastic. The reaction polymer may be, for example, an adhesive, a sealant, a gasket, a dynamic elastomer, a thermal insulating foam, a cushioning foam, a structural foam or an injection-molded article. The reaction particle may be reinforced with fibers or other reinforcements.

The following examples are provided to illustrate the invention, but are not intended to limit the scope thereof. All parts and percentages are by weight unless otherwise indicated.

EXAMPLES 1 AND 2

1440 g of an 800 molecular weight propoxylated allyl alcohol and 225 of a zinc hexacyanocobaltate catalyst complex are heated under vacuum at 140° C. 234 g of propylene oxide are added and the reactor is monitored for a pressure drop, which indicates the catalyst has become active. 3379 g of a 98:2 by weight mixture of propylene oxide and ethylene oxide are fed into the reactor over 3.6 hours under polymerization conditions. Then, the feed is continued for another 156 minutes, during which the concentration of propylene oxide of the oxide mixture is decreased linearly with time to 0%. This produces an unsaturated polyether monol with a hydroxyl number of 14.3 g (equivalent and molecular weights of about 3900). The monol contains about 18.5% by weight polymerized ethylene oxide. 65.7% of the hydroxyl groups are primary.

To produce Example 1, 96.8 g of the monol are mixed with 1.83 g of 1-mercaptoethanol and 150 mg of 2,2-dimethoxy phenyl acetophenone. The reaction vessel is purged of oxygen and its contents are allowed to react at room temperature under nitrogen for 4 hours while being irradiated with a 6 watt UV lamp. Volatiles are stripped from the resulting product. The stripped product is a polyether diol having an OH value of 26.6 and a viscosity of 1219 cSt at 25° C. 82.3% of the hydroxyl groups are primary.

To produce Example 2, 99.4 g of the monol are mixed with 8.67 g of 1-mercaptoethanol and 250 mg of an organic peroxide. The reaction vessel is purged of oxygen, heated to 90° C. and its contents allowed to react for 4 hours before stripping the product. The product is a polyether diol that has a hydroxyl number of 26 and a viscosity of 1145 cSt at 25° C. 81.9% of the hydroxyl groups are primary.

EXAMPLE 3

937 g of an 800 molecular weight propoxylated undecenyl alcohol and 150 mg of a zinc hexacyanocobaltate catalyst complex are heated under vacuum at 140° C. A mixture of 150 g propylene oxide and 3 g ethylene oxide is added and the reactor is monitored for a pressure drop, which indicates the catalyst has become active. 2280 g of a 98:2 by weight mixture of propylene oxide and ethylene oxide is then fed into the reactor over 3.6 hours under polymerization conditions. The alkylene oxide feed is then continued for another 156 minutes, during which the concentration of propylene oxide of the oxide mixture is decreased linearly with time to 0%. This produces an unsaturated polyether monol with a hydroxyl number of 13.3 g (equivalent and molecular weights of about 4220). The monol contains about 17% by weight polymerized ethylene oxide. 67% of the hydroxyl groups are primary.

99.3 g of this monol and 1.8 g of 2-mercaptoethanol are mixed in a glass flask. 250 mg of Trigonox 121 are added followed by de-oxygenation. The mixture is heated to 90° C. and stirred for 3 hours. The product, analyzed with NMR, is a polyether diol in which 79.2% of the hydroxyl groups are primary.

What is claimed is:

1. A method of making a polyether diol having a hydroxyl number of 56 or lower and an average hydroxyl functionality of 1.8 to 2.0, in which at least 70% of the hydroxyl groups are primary, the method comprising:
   I) forming a polyether monol in a double metal cyanide-catalyzed polymerization that includes a first stage and a second stage, the polyether monol having a terminal hydroxyl group at one end of a polyether chain and at least one unsaturated terminal group at the other end of the polyether chain, the unsaturated terminal group including at least one aliphatic carbon-carbon double bond, wherein the polyether monol has a molecular weight of at least 1950 and at least 39% of the hydroxyl groups are primary, wherein:
   in the first stage, an alkylene oxide containing 95 to 100% by weight 1,2-propylene oxide, 0 to 5% by weight ethylene oxide and 0 to 2% by weight of other copolymerizable monomers is polymerized in the presence of at least one initiator, said at least one initiator including at least one monoalcohol having exactly one aliphatic carbon-carbon double bond, said alkylene oxide polymerized onto said at least one monoalcohol initiator in said first stage constituting 55 to 75% of the weight of the polyether monol formed in step I), and
   in the second stage, an alkylene oxide mixture is introduced to the reaction product formed in the first stage under polymerization conditions, wherein such alkylene oxide mixture is introduced as an alkylene oxide feed in which the concentration of the ethylene oxide in the alkylene oxide feed is continuously or intermittently increased from at most 5% by weight until the alkylene oxide feed contains 90 to 100% by weight ethylene oxide, 0 to 10% by weight 1,2-propylene oxide and 0 to 2% by weight of other copolymerizable monomers, based on the weight of the alkylene oxide feed, and the alkylene oxide feed is discontinued after the concentration of ethylene oxide in the alkylene oxide mixture reaches 90% but before or at the same time as the concentration of ethylene oxide in the alkylene oxide mixture reaches 100% by weight, and the resulting reaction mixture is thereafter digested to form the polyether monol, and then
   II. reacting the polyether monol from step I with a thiol-substituted primary alcohol such that the thiol reacts across the aliphatic carbon-carbon double bond of the unsaturated terminal group of the polyether monol to produce the polyether diol.

2. The process of claim 1 wherein the monoalcohol initiator is selected from the group consisting of vinyl alcohol, 1-propen-3-ol, 1-buten-4-ol, 1-hexen-6-ol, 1-heptene-7-ol, 1-octen-8-ol, 1-nonen-9-ol, 1-decen-10-ol, 1-undecen-11-ol, 1-dodecen-12-ol, allyl alcohol, hydroxyethylacrylate, hydroxypropylacrylate, hydroethylmethacrylate, an alkoxylate of any of the foregoing having a molecular weight of up and a mixture of any two or more thereof.

3. The process of claim 1 wherein the thiol compound is selected from the group consisting of 2-mercaptoethanol, 2-mercapto-n-propanol, 3-mercapto-n-propanol, 4-mercapto-n-butanol, 6-mercapto-n-hexanol and a mixture of any two or more thereof.

4. The process of claim 1 wherein the double metal cyanide catalyst includes a zinc hexacyanocobaltate.

5. The process of claim 1 wherein the polyether diol has a hydroxyl number of 7 to 56.

6. The process of claim 5 wherein the polyether diol has a hydroxyl number of 14 to 40.

7. The process of claim 1 wherein the polyether diol has a functionality of at least 1.9.

8. The process of claim 1 wherein the polyether diol has a functionality of 1.95 to 2.0.

9. The process of claim 1 wherein the first stage of step I is performed in the presence of a mixture of the unsaturated monoalcohol initiator and at least one diol initiator.

10. The process of claim 1 wherein the first stage of step I is performed in the absence any initiator compound having 3 or more oxyalkylatable sites.

11. The process of claim 1 wherein the first stage of step I is performed in the absence of any initiator compound except the at least one unsaturated monoalcohol initiator.

* * * * *